United States Patent
Khouphongsy (10) Patent No.: US 9,616,839 B2
(45) Date of Patent: Apr. 11, 2017

(54) H-POINT REFERENCED SEAT CUSHION AIRBAG SYSTEM

(71) Applicant: Toyota Motor Engineering & Manufacturing North America, Inc., Erlanger, KY (US)

(72) Inventor: Emily Ann Khouphongsy, Saline, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/280,635

(22) Filed: May 18, 2014

(65) Prior Publication Data
US 2015/0329074 A1 Nov. 19, 2015

(51) Int. Cl.
| | | |
|---|---|---|
| B60R 21/16 | (2006.01) | |
| B60R 21/207 | (2006.01) | |
| B60R 21/2334 | (2011.01) | |
| B60N 2/42 | (2006.01) | |
| B60N 2/427 | (2006.01) | |
| B60R 21/00 | (2006.01) | |

(52) U.S. Cl.
CPC .......... *B60R 21/207* (2013.01); *B60N 2/4221* (2013.01); *B60N 2/42718* (2013.01); *B60R 21/2334* (2013.01); *B60R 2021/0044* (2013.01); *B60R 2021/0055* (2013.01)

(58) Field of Classification Search
CPC ................. B60R 21/207; B60R 2021/23146
USPC .................... 280/728.1, 728.2, 728.3, 730.2
See application file for complete search history.

(56) References Cited

U.S. PATENT DOCUMENTS

| | | | |
|---|---|---|---|
| 7,377,544 B2 * | 5/2008 | Itoga | 280/733 |
| 7,481,452 B2 * | 1/2009 | Itoga et al. | 280/733 |
| 7,497,462 B2 * | 3/2009 | Sakai et al. | 280/728.1 |
| 7,527,333 B2 * | 5/2009 | Suzuki et al. | 297/216.1 |
| 8,573,633 B2 * | 11/2013 | Kino et al. | 280/730.1 |
| 8,641,086 B2 | 2/2014 | Hashido et al. | |
| 8,888,126 B2 * | 11/2014 | Nukaya | B60N 2/42718 280/730.1 |
| 2001/0011810 A1 * | 8/2001 | Saiguchi et al. | 280/728.1 |
| 2002/0067032 A1 * | 6/2002 | Ishikawa | B60R 21/233 280/743.1 |
| 2003/0230872 A1 * | 12/2003 | Sakai et al. | 280/728.1 |
| 2005/0046156 A1 * | 3/2005 | Yoshikawa et al. | 280/728.2 |
| 2007/0228699 A1 * | 10/2007 | Bederka | B60R 21/207 280/730.2 |
| 2007/0235993 A1 * | 10/2007 | Yoshikawa et al. | 280/730.1 |
| 2007/0262568 A1 * | 11/2007 | Itoga et al. | 280/728.2 |
| 2009/0045606 A1 * | 2/2009 | Yoshikawa et al. | 280/728.2 |
| 2009/0127832 A1 * | 5/2009 | Yoshikawa | 280/728.2 |
| 2012/0193953 A1 | 8/2012 | Kino et al. | |
| 2013/0082457 A1 | 4/2013 | Hashido et al. | |

FOREIGN PATENT DOCUMENTS

| | | | |
|---|---|---|---|
| JP | 2007069663 A | 3/2007 | |
| JP | 2009132245 A | 6/2009 | |

* cited by examiner

*Primary Examiner* — Toan To
(74) *Attorney, Agent, or Firm* — Christopher G. Darrow; Darrow Mustafa PC (57) ABSTRACT

A seat cushion airbag system includes an inflatable airbag with a boundary that bounds an inflatable area, the boundary positioned with respect to an H-point of an occupant.

16 Claims, 8 Drawing Sheets

Thigh Angle @ 40ms
(Standard CAB vs. H-Point Referenced CAB)

H-POINT REFERENCED SEAT CUSHION AIRBAG SYSTEM

BACKGROUND

The present disclosure relates generally to an airbag system and, more particularly, to a seat cushion airbag (CAB) system for a vehicle.

Airbag modules have become common in modern vehicles. An airbag module typically includes an inflatable airbag and an inflator within a housing. The airbag module is installed in a desired position within the vehicle, such as a steering wheel, dashboard, seat, vehicle doors, A-pillar, and other locations. In response to an activation event, a sensor activates the inflator to generate an inflation gas that rapidly inflates the inflatable airbag to facilitate protection of an occupant.

More recently, seat cushion airbags have been installed within a seat pan of a vehicle seat assembly to reduce occupant chest deceleration. Although effective, optimization of seat cushion airbag operation is in its infancy.

SUMMARY

A seat cushion airbag system is disposed in a selected spatial relationship with respect to an H-point (or hip-point) of an occupant. An aft boundary of an inflatable airbag bounds an inflatable area and is positioned with respect to the H-point to facilitate application of a force to a pelvis of the occupant that reduces chest deflection and improves chest deceleration as compared to a standard cushion airbag. The H-point referenced inflatable airbag facilitates a heretofore unavailable reductions in relative chest deflection.

A seat cushion airbag system according to one disclosed non-limiting embodiment of the present disclosure includes an inflatable airbag with a boundary that bounds an inflatable area, the boundary positioned generally vertically in-line with an H-point of an occupant in an undeployed condition.

A seat cushion airbag system according to another disclosed non-limiting embodiment of the present disclosure includes an inflator and an inflatable airbag with a boundary that bounds an inflatable area, the boundary including an opening for a wire harness to an inflator contained within the boundary, the boundary positioned generally vertically in-line with an H-point of an occupant in an undeployed condition.

A seat cushion airbag system according to one disclosed non-limiting embodiment of the present disclosure includes an inflatable airbag positioned generally vertically in-line with an H-point of an occupant to rotate a pelvis of the occupant by at least about ten degrees upon deployment of the inflatable airbag.

The foregoing features and elements may be combined in various combinations without exclusivity, unless expressly indicated otherwise. These features and elements as well as the operation thereof will become more apparent in light of the following description and the accompanying drawings. It should be appreciated, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
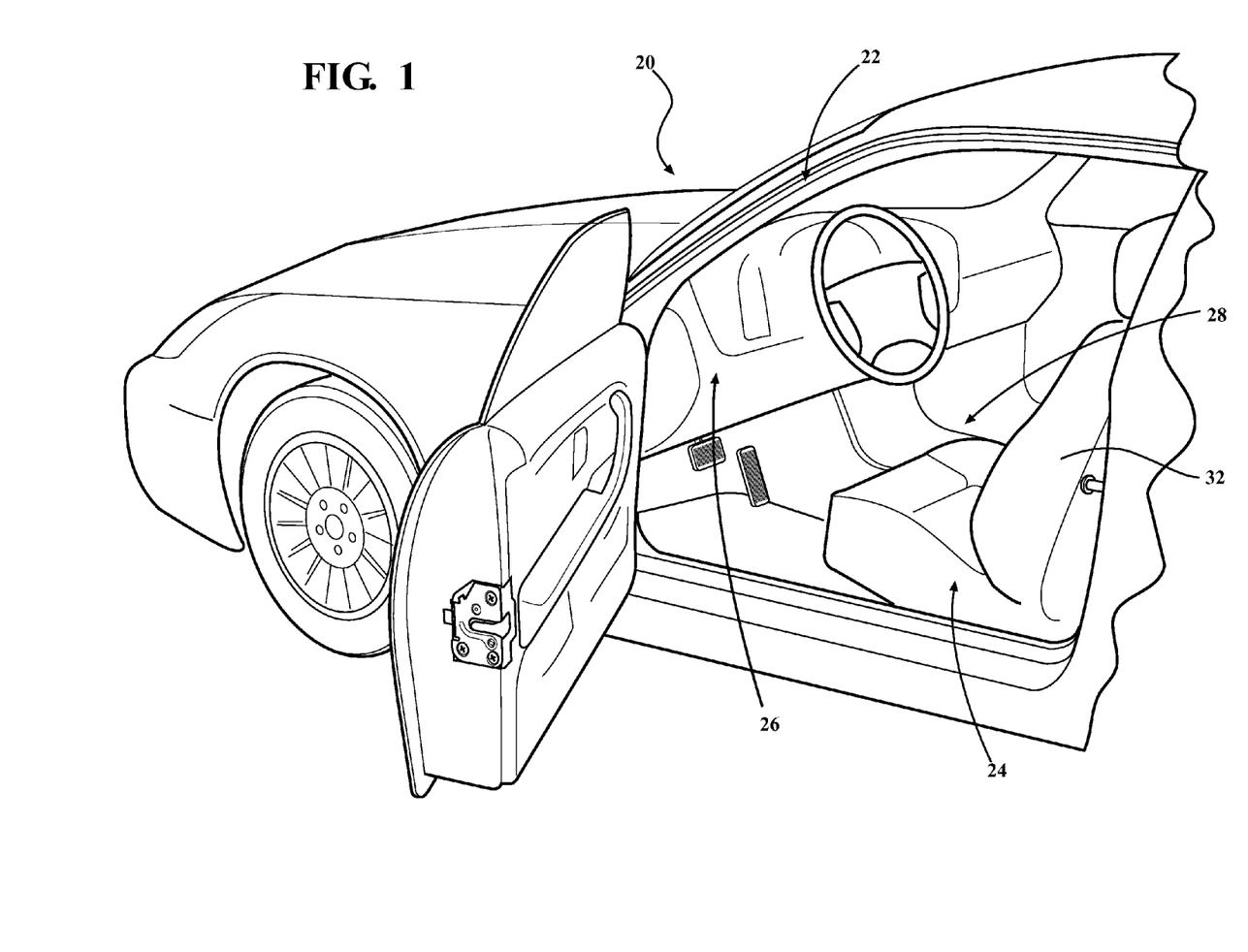
FIG. 1 is a partial perspective view of a vehicle occupant compartment.

FIG. 1 schematically illustrates selected portions of a vehicle 20. The vehicle 20 generally includes a body 22 with a vehicle seat 24 aft of an instrument panel 26 within an occupant seating area 28. The seat generally includes a lower seat structure 30 and a seat back structure 32. Although a driver's vehicle seat 24 is illustrated in the disclosed non-limiting embodiment, it should be appreciated that other occupant positions such as a rear seat as well as other vehicles such as an aircraft will also benefit herefrom.

Figure 2:
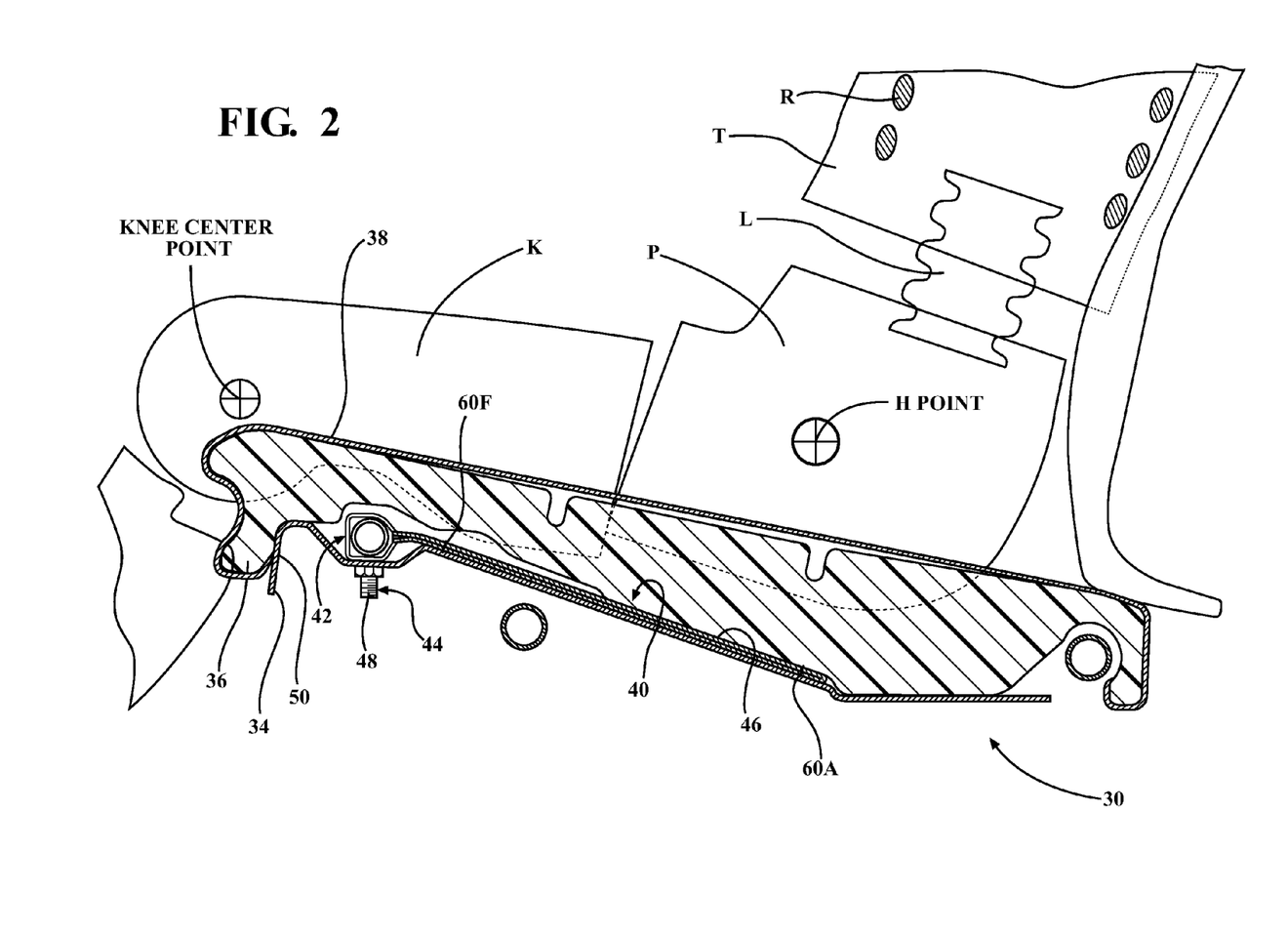
FIG. 2 is a schematic side sectional view of a vehicle seat with an H-point referenced seat cushion airbag system.
Figure 3:
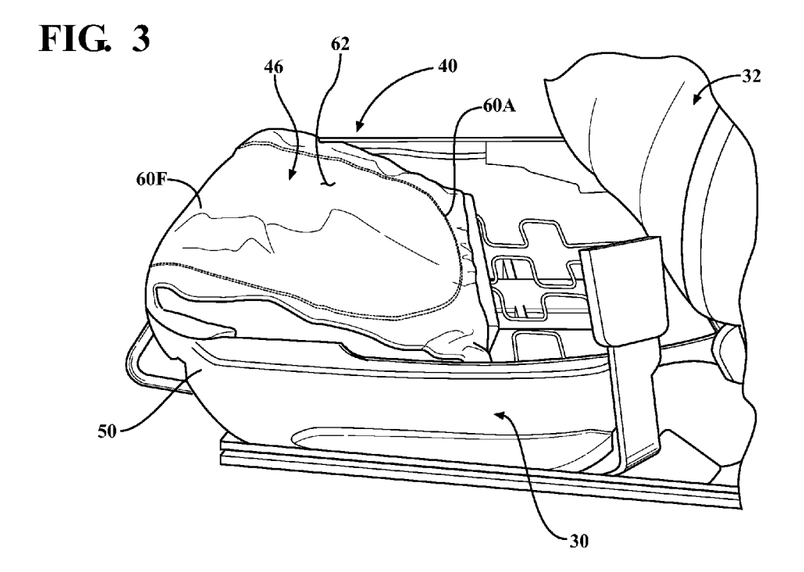
FIG. 3 is a partial perspective view of a vehicle seat without a seat cushion with an H-point referenced seat cushion airbag system in an undeployed condition.

With reference to FIG. 2, the lower seat structure 30 generally includes a frame 34, a cushion 36, a cover 38, and an H-point referenced seat cushion airbag (CAB) system 40 (also shown in FIG. 3). The frame 34 is typically manufactured of a metal alloy or composite material to provide support for the lower seat structure 30. The cushion 36 may be manufactured of a urethane while the cover 38 may be manufactured of a cloth or leather to provide a durable and aesthetic seating surface.

The seat cushion airbag system 40 is disposed in a selected spatial relationship with an occupant seated upon the lower seat structure 30. The seat cushion airbag system 40 generally includes an inflator 42, a mount 44 and an inflatable airbag 46. The inflatable airbag 46 is manufactured of a fabric material such as nylon or polyester. In accordance with one disclosed non-limiting embodiment, the mount 44 may include screw studs 48 (FIG. 4) that extend from the inflator 42 for attachment to the lower seat structure 30. The mount 44 positions the inflator 42 toward a front portion 50 of the frame 34 generally forward of the inflatable airbag 46. In this disclosed non-limiting embodiment, the inflatable airbag 46 need not be contained within a housing but simply lays between the frame 34 and the cushion 36 until deployed.

Figure 4:
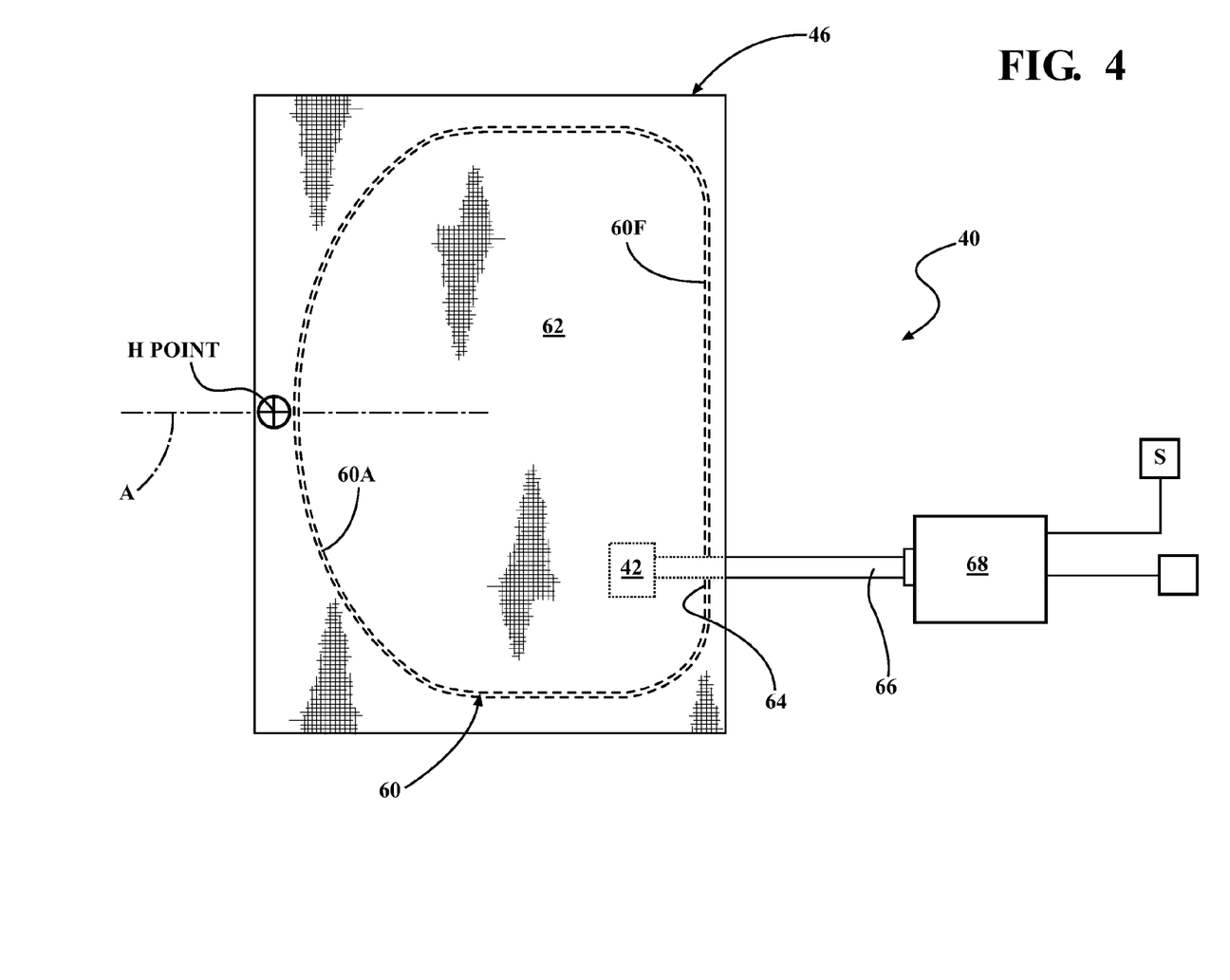
FIG. 4 is a schematic top view of an H-point referenced seat cushion airbag system.
Figure 5:
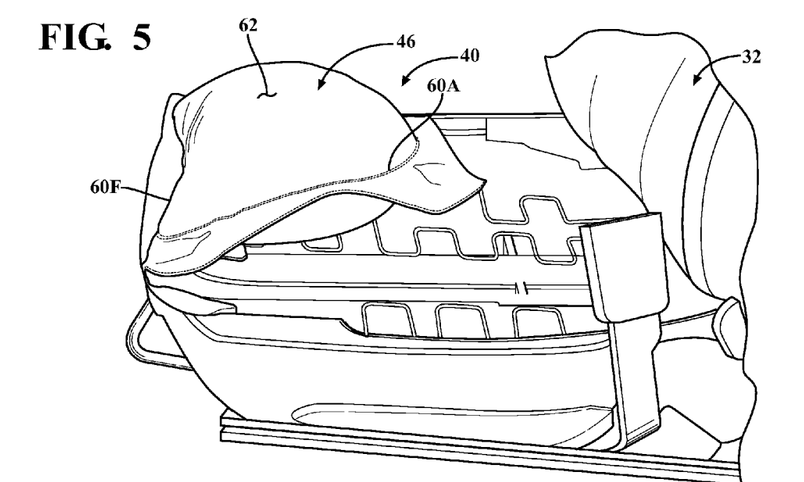
FIG. 5 is a partial perspective view of a vehicle seat without a seat cushion with an H-point referenced seat cushion airbag system in a deployed condition.

With reference to FIG. 4, the inflatable airbag 46 includes a boundary 60 that bounds an inflatable area 62 (shown inflated in FIG. 5). That is, the boundary 60 attaches the layers of the inflatable airbag 46 to form the inflatable area 62 such that the area outside of the boundary 60 does not inflate. A stitch, a double stitch, a seal, or other demarcation that defines a periphery of the inflatable area 62 defines the boundary 60. The inflatable area 62 is thereby formed within the boundary 60 to support the relatively high pressures as well as maintain such pressures formed by the inflation gas for a relatively longer period of time. The boundary 60 in one disclosed non-limiting embodiment may preferably be a double stitch or other reinforced seal line to facilitate resistance to the relatively high pressures.

The inflator 42 in this disclosed non-limiting embodiment is contained within the boundary 60 to selectively fill the inflatable area 62 with the inflation gas upon activation. It should be appreciated that the inflator 42 may be otherwise in communication with the inflatable area 62 to supply inflation gas thereto.

The inflatable area 62 in one disclosed non-limiting embodiment is essentially contiguous, e.g., no large vent is provided, but for a relatively small opening 64. The opening 64 provides access for a wire harness 66 to connect the inflator 42 to a control system 68 (shown schematically). In one example, the opening 64 is about 35 mm and is offset from a longitudinal centerline A of the inflatable area 62.

One or more sensors S that are disposed about the vehicle in accordance with known technologies to detect a threshold event to initiate the inflator 42. The inflator 42 is initiated in response to the control system 68 interrogations of signals from the sensors S to generate the inflation gas such that the inflatable airbag 46 is deployed with respect to the frame 34 (FIG. 3). The deployed inflatable airbag 46 at least partially displaces the cushion 36 and the occupant thereon in response to the threshold event as will be further detailed. It should be appreciated that various delay times from, for example, 0 ms-25 ms may be utilized between the threshold event and deployment.

The control system 68 generally includes a control module with a processor, a memory, and an interface. The control module may be a portion of a central vehicle control, a stand-alone unit or other system. The processor may be any type of microprocessor having desired performance characteristics. The memory may include any type of computer readable medium that stores the data and control algorithms described herein such as those that morph the energy absorbing structure. The operational software for the processor may also be stored in the memory as standalone software modules, or as modules that employ external routines, code, services, and so forth, or any combination of these such that various implementations are within the scope of the present disclosure.

Figure 6:
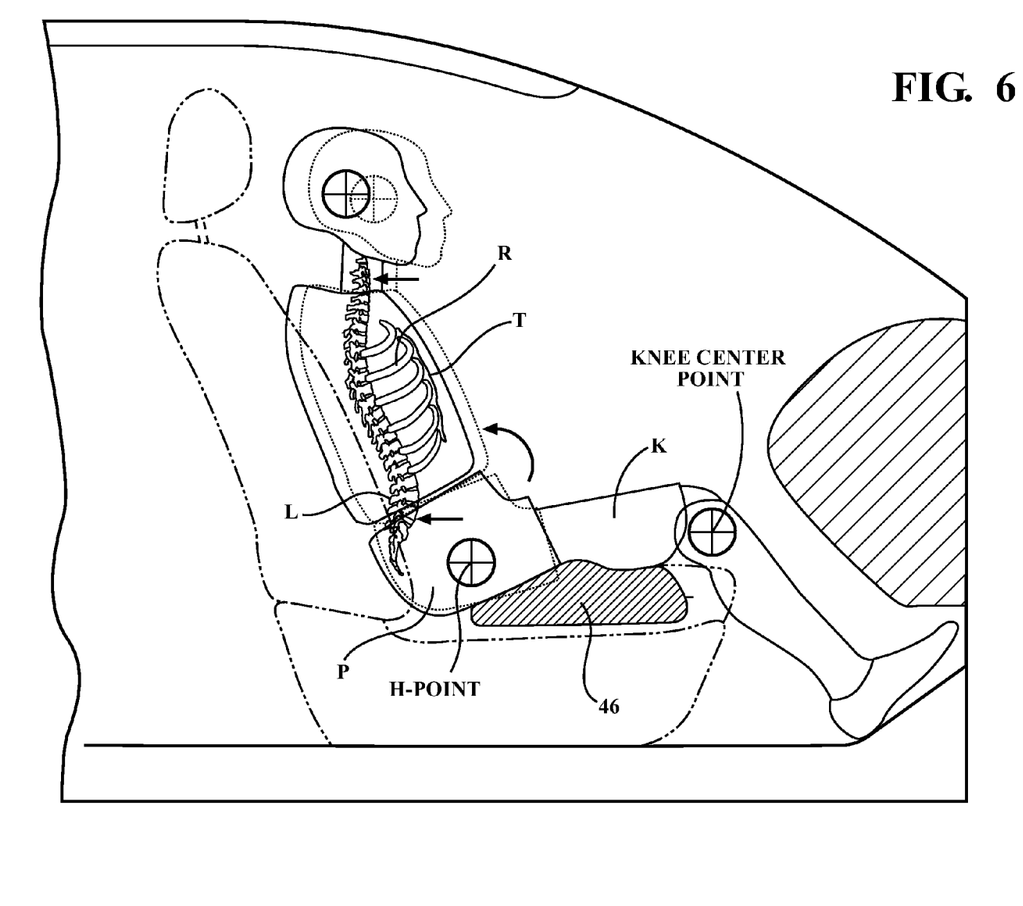
FIG. 6 is a schematic sectional view of an occupant positioned on a vehicle seat with respect to a deployed H-point referenced seat cushion airbag system.

With reference to FIG. 6, and as will be further discussed below, deployment of the inflatable airbag 46 rotates the occupant pelvis P rearward to increase lumbar spine area L movement. The lumbar spine area L generally refers to the lower back, where the spine curves inward toward the abdomen. It starts below the shoulder blades, and connects with the thoracic spine at the top and extends downward to the sacral spine. The lumbar spine area L of the occupant moves rearward in response to rotation of the occupant pelvis P such that the occupant's torso T also moves rearward to reduce seatbelt and airbag forces on the occupant's ribs R. The resultant increased angle of the occupant's thigh K with greater rotation of the pelvis P delivers increased lumbar spine area L movement and thus greater torso T restraint.

In one example, the angle of an occupant's pelvis P is about twenty-one (21) degrees in a typical seated position and deployment of the inflatable airbag 46 increases this angle to about thirty-one (31) degrees, i.e., ten degrees (10) of rotation is provided. In another example, a torso T to pelvis P relationship is changed by about fifteen (15) degrees between the typical seated position and the deployed condition of the inflatable airbag 46.

Government regulations currently limit chest deceleration of an anthropomorphic test device to 60 g; with one example vehicle having a typical 43 g that is reduced to 40 g with the deployment of the H-point referenced inflatable airbag 46. Other government ratings incorporate chest deflection in the rating calculation, with lower chest deflections resulting in better ratings. One example vehicle achieves a chest deflection of only about 10 mm with the deployment of the H-point referenced inflatable airbag 46. It should be appreciated that these are only examples to illustrate the effectiveness of the H-point referenced inflatable airbag 46 and that other results may be achieved that may otherwise vary dependent upon, for example, occupant size, position, event, seat structure stiffness, etc.

Figure 7:
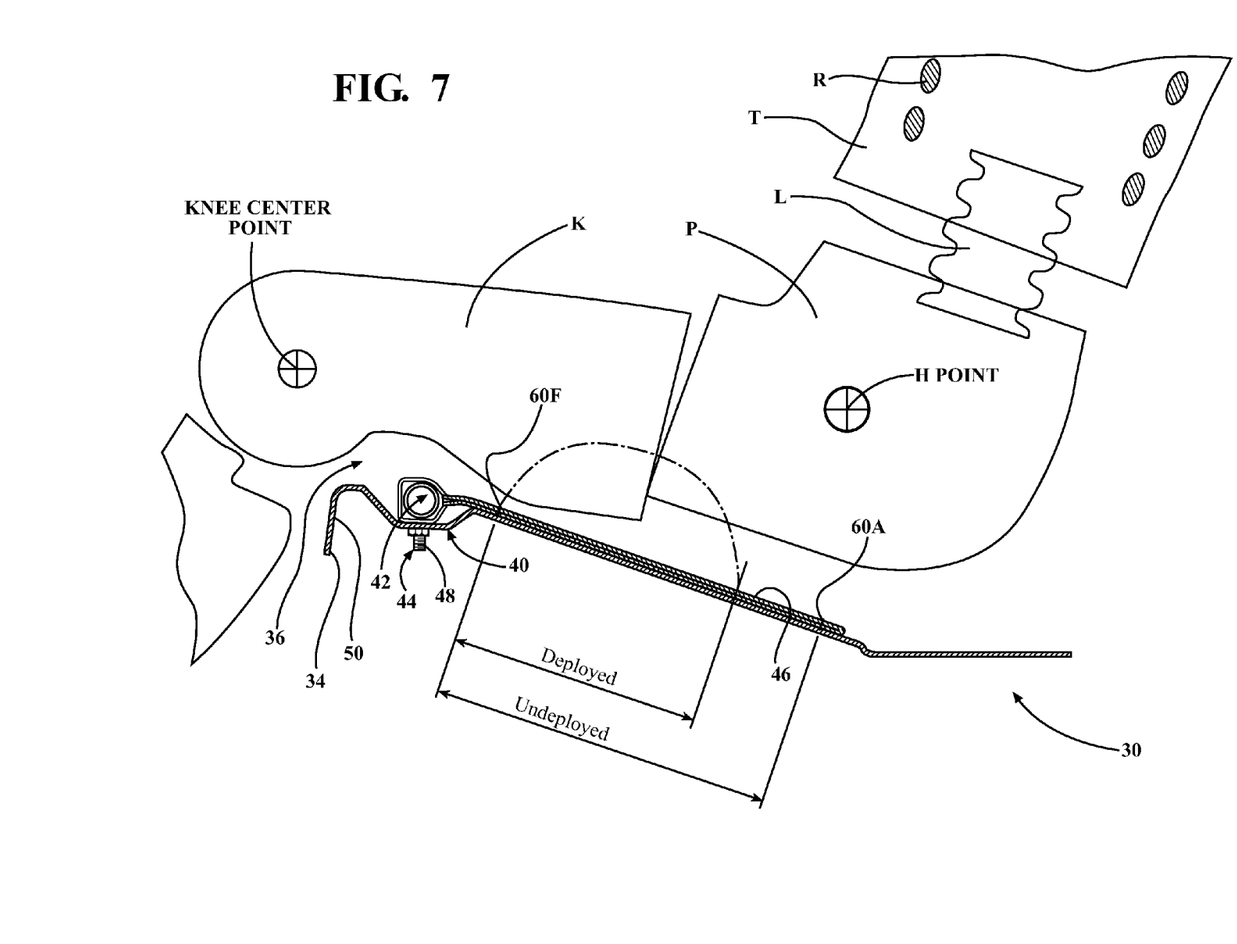
FIG. 7 is a schematic side sectional view of a vehicle seat with an H-point referenced seat cushion airbag system shown as a deployed to undeployed dimensional relationship.

With reference to FIG. 7, the aft boundary 60A that bounds the inflatable area 62 is positioned generally vertically in-line with respect to an H-point of the occupant when the inflatable airbag 46 is in an undeployed condition. The H-point (or hip-point) is the theoretical, relative location of an occupant's hip, specifically, the pivot point between the torso T and thigh K. The H-point can be measured relative to other features, such as a floor of the vehicle or the height above pavement. A vehicle with a "high H-point" may have an H-point that is "high" relative to the vehicle floor, the road surface, or both. The H-point, as often defined in national and international vehicle design standards, is typically related to the hip joint of a 50th percentile male occupant (AM50) driver and a 5th percentile female occupant (FM50) passenger viewed laterally. For further perspective, the Society of Automotive Engineers (SAE) J1100 Interior Measurement Index sets parameters for such measurements as H30 (H-point to vehicle floor), HS (H-point to pavement surface), H61 (H-point to interior ceiling), and H25 (H-point to windowsill).

Location of the aft boundary 60A generally vertically in-line with the occupant H-point facilitates application of a force to the pelvis P (FIG. 8) by the deployed H-point referenced inflatable airbag 46 that facilitates a reduction in chest deflection (FIG. 9) in addition to improved chest deceleration as compared to a standard cushion airbag. That is, the H-point referenced inflatable airbag 46 facilitates a heretofore unavailable relative chest deflection reduction.

The deployed H-point referenced inflatable airbag 46 rotates the pelvis P rearward. The torso T reacts by rotating rearward to relieve other external loads on the chest such as produced by a seatbelt or frontal airbag. In other words, the force vector and magnitude of pelvis P rearward rotation is increased and sustained longer due to the H-point relationship with the aft boundary 60A. This motion facilitates an enhancement of occupant restraint to control chest forward movement in high-speed flat frontal impacts.

In one disclosed non-limiting embodiment, the aft boundary 60A is located vertically in-line with the occupant H-point. As defined herein, vertically in-line with the occupant H-point need not be exactly in-line alone, but includes a region proximate the occupant H-point in an X-direction along the longitudinal axis A and, preferably, slightly forward thereof. It should be appreciated that this location is typically referenced with respect to a 50th percentile male occupant (AM50) driver and a 5th percentile female occupant (FM50) passenger such that the location may be different for each occupant position based, for example, on the expected occupant of that seat. The aft boundary 60A is located proximate the occupant H-point in the X-direction by, in this embodiment, about 10% or 10 mm thereof with respect to a longitudinal inflatable area 62 distance between the aft boundary 60A and the forward boundary 60F of about 260 mm undeployed (about 190 mm deployed).

Figure 8:
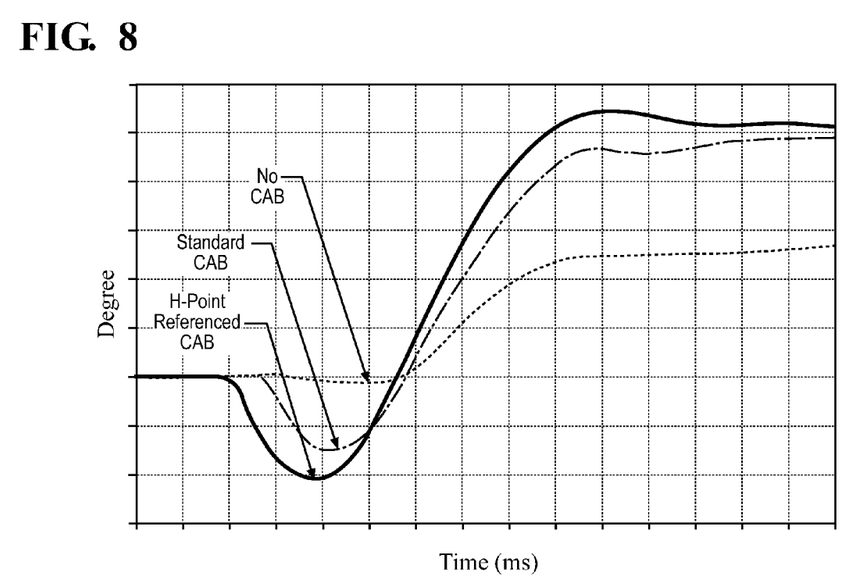
FIG. 8 is a graphical representation of pelvis angle change over time to compare an H-point referenced seat cushion airbag system, a standard seat cushion airbag system, and no seat cushion airbag system.

With reference to FIG. 8, location of the aft boundary 60A with respect to the occupant H-point facilitates application of a force to the pelvis P and thereby more significantly increases the angle thereof compared to a standard cushion airbag (standard CAB).

Figure 9:
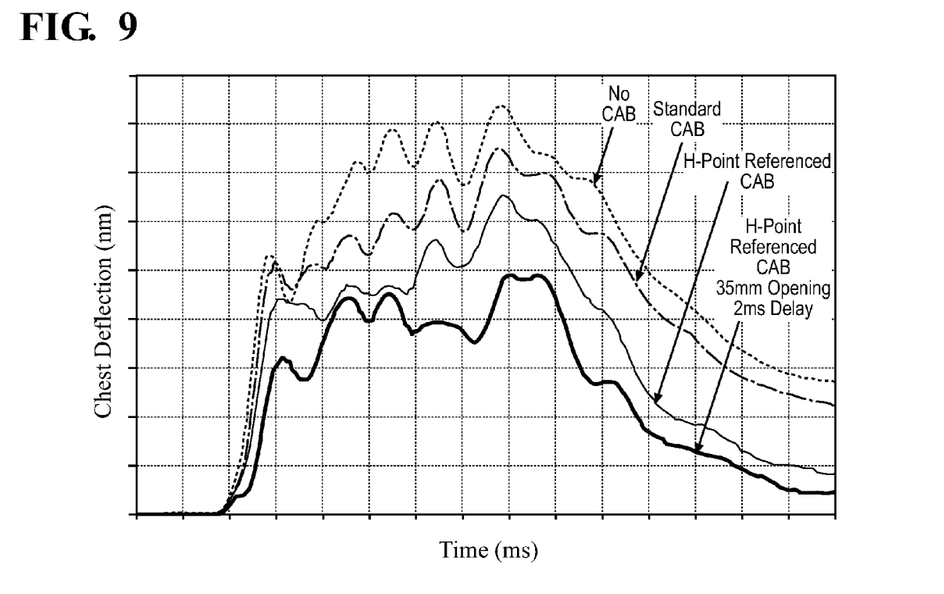
FIG. 9 is a graphical representation of chest deflection over time to compare an H-point referenced seat cushion airbag system, a standard seat cushion airbag system, and a no seat cushion airbag system.

With reference to FIG. 9, location of the aft boundary 60A with respect to the occupant H-point facilitates a reduction in chest deflection as compared to a standard cushion airbag (standard CAB). In addition, the relatively small opening 64, here identified as the 35 mm opening, facilitates further reduction in chest deflection as the inflation gas is retained relatively longer. That is, relatively conventional rapid venting is reduced by a close fit with the wire harness 66.

Figure 10:
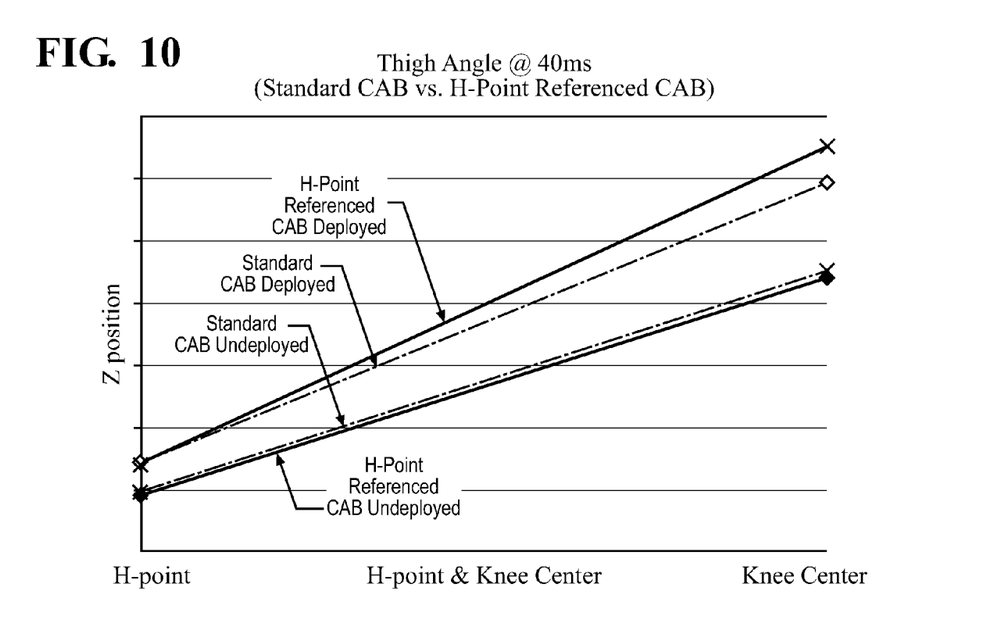
FIG. 10 is a graphical representation of thigh angle change between an H-point and a knee center to compare an H-point referenced seat cushion airbag system and a standard seat cushion airbag system.

With reference to FIG. 10, the H-point relationship with the aft boundary 60A location increases the angle of the thigh K by increased knee position with minimal, if any, increase to occupant H-point Z movement such that the occupant is not just lifted upwards, i.e., moved in the Z direction. That is, the angle of thigh K is higher but H-point position is not undesirably increased.

It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be appreciated that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A seat cushion airbag system, comprising:
   an inflatable airbag including an inflatable area,
      said inflatable area including an aft boundary that bounds the inflatable area,
      said aft boundary positioned slightly forward of an H-point of an occupant in an undeployed condition and positioned farther forward of the H-point of the occupant in a deployed condition, wherein said H-point is defined as the hip point of a $50^{th}$ percentile male occupant and a $5^{th}$ percentile female occupant.

2. The system as recited in claim 1, wherein said aft boundary is positioned within about 10 mm of the H-point in an undeployed condition.

3. The system as recited in claim 1, wherein said aft boundary includes a double stitch.

4. The system as recited in claim 1, wherein a torso to pelvis relationship of the occupant is changed by at least ten (10) degrees between the undeployed condition and the deployed condition.

5. The system as recited in claim 4, wherein the torso to pelvis relationship is changed by about fifteen (15) degrees between the undeployed condition and the deployed condition.

6. The system as recited in claim 1, wherein said aft boundary is positioned approximately 70 mm forward of the H-point in the deployed condition.

7. A seat cushion airbag system, comprising:
   an inflatable airbag including an inflatable area,
   said inflatable area including an aft boundary that bounds the inflatable area,
   said aft boundary positioned generally vertically in-line with an H-point of an occupant in an undeployed condition and positioned substantially forward of the H-point of the occupant in a deployed condition, wherein said inflatable area further includes a forward boundary with an opening for a wire harness to an inflator within said inflatable area.

8. A seat cushion airbag system, comprising:
   an inflator; and
   an inflatable airbag with a boundary that bounds an inflatable area,
      said boundary including a forward boundary including an opening for a wire harness to said inflator contained within said inflatable area,
      said boundary further including an aft boundary positioned generally vertically in-line with an H-point of an occupant in an undeployed condition and positioned substantially forward of the H-point of the occupant in a deployed condition.

9. The system as recited in claim 8, wherein said boundary includes a double stitch.

10. The system as recited in claim 8, wherein said opening is offset from a longitudinal centerline of said forward boundary.

11. The system as recited in claim 8, wherein said opening is about 35 mm wide.

12. The system as recited in claim 8, wherein said inflator includes mounts for attachment to a frame of a lower seat structure.

13. The system as recited in claim 8, wherein said inflatable airbag includes a flap with apertures that folds at the forward boundary to receive a multiple of studs that extend from said inflator.

14. The system as recited in claim 8, wherein a torso to pelvis relationship of the occupant is changed by at least ten (10) degrees between the undeployed condition and the deployed condition.

15. The system as recited in claim 8, wherein said aft boundary is positioned approximately 70 mm forward of the H-point in the deployed condition.

16. A seat cushion airbag system, comprising:
   an inflatable airbag including an inflatable area,
   said inflatable area including an aft boundary that bounds the inflatable area,
   said aft boundary positioned generally vertically in-line with an H-point of an occupant in an undeployed condition, wherein said H-point is defined as the hip point of a $50^{th}$ percentile male occupant and a $5^{th}$ percentile female occupant.

* * * * *